United States Patent [19]

White, III

[11] Patent Number: 5,631,737

[45] Date of Patent: May 20, 1997

[54] HIGH-ENERGY LASER WITH MULTIPLE PHASED OUTPUTS

[75] Inventor: Frederic H. White, III, Simi Valley, Calif.

[73] Assignee: Rockwell International Corporation, Seal Beach, Calif.

[21] Appl. No.: 617,219

[22] Filed: Jun. 4, 1984

[51] Int. Cl.$^6$ ............................................. H01S 3/083
[52] U.S. Cl. ............................ 356/350; 372/18; 372/32
[58] Field of Search ............................. 330/4.3; 372/18, 372/29, 32, 93–97; 356/350

[56] References Cited

U.S. PATENT DOCUMENTS

| | | | |
|---|---|---|---|
| 3,277,392 | 10/1966 | Nicolai | 372/94 |
| 3,496,487 | 2/1970 | Shaffer | 372/18 |
| 3,691,483 | 9/1972 | Klien | 372/18 |
| 3,825,845 | 7/1974 | Angelbeach et al. | 330/4.3 |
| 3,887,776 | 6/1975 | Zeidly | 330/4.3 |
| 4,295,741 | 10/1981 | Palma et al. | 330/4.3 |
| 4,516,244 | 5/1985 | Holmes | 372/93 |
| 4,549,144 | 10/1985 | Summers | 372/94 |

*Primary Examiner*—Nelson Moskowitz
*Attorney, Agent, or Firm*—Harry B. Field; Steven E. Kahm

[57] ABSTRACT

A high-energy laser 10 comprising a ring of lesser-powered laser modules 12,14,16 from each of which an output is taken to be projected so that they all arrive in phase on a distant target. To phase-lock the outputs of all the serial laser modules, the path lengths (l) of the laser modules are made equal, the path length around the large loop which includes all the laser modules is made an integral multiple of the laser-module path length, and at least two different feedback loops are employed.

9 Claims, 4 Drawing Sheets

HIGH-ENERGY LASER WITH MULTIPLE PHASED OUTPUTS

BACKGROUND OF THE INVENTION

1. Field of the Invention

This invention relates to a high-energy laser (HALE) and especially to a HALE consisting of a plurality of lower-power lasers forming a large loop, the outputs of each individual laser remaining in phase with the output of the large loop.

2. Description of the Prior Art

In the process of directing laser energy against a remote target to destroy or damage it, a large amount of coherent laser energy must inpinge on the target. The intensity of the laser beams at the target increases with the laser power and with the area of the telescope aperture (telescopes are generally used in this type of laser application). There are practical limits to the size of both the laser and the telescope that can be constructed with the optical precision and power-handling capabilities that are required. Thus, it would be highly desirable to operate with several smaller lasers (less power) and smaller telescopes directed separately at the same target. This requires that the outputs from the various lasers be locked in frequency and phase and that the path lengths from the lasers to the targets be controlled in order for the beams to combine coherently at the target to provide the higher power which is required and desired.

OBJECTS OF THE INVENTION

An object of this invention is to obtain outputs having the same frequencies from a plurality of lasers, the outputs of the same frequencies of the different lasers being in phase with each other.

Another object is to project a beam of high intensity on a target, the beam at the target being composed of in-phase beams from several low-powered lasers which add coherently to provide the high intensity.

A further object is to replace a high-power laser using a large telescope with several lower-power lasers using smaller telescopes and yet achieve the same high-intensity beam on the target by combining the lower-power beams at the target.

Other objects, advantages and novel features of the present invention will become apparent from the following detailed description of the invention when considered in conjunction with the accompanying drawings.

SUMMARY OF THE INVENTION

The objects and advantages of the present invention are achieved by placing a plurality, N, of laser modules in a large series loop, or ring, with the output of the last laser being fed to the input of the first laser module. Each laser module has a laser length, l. The resonance condition for modes of resonance of the large ring is:

$$Nl = K\lambda_K$$

where K is an integer, so that the wave reproduces itself after each round trip through the large ring and $\lambda_K$ is the wavelength of a mode of oscillation.

Each mode which lases must have the same phase at every laser output in order for path-length control to bring the output beams to the target in the same phase.

The conditions which are achieved to phase-lock the output of each laser module are:

(1) the path lengths (l) of all laser modules are made equal;

(2) the path length around the large ring is made an integral multiple of the path length (l) of each module; and (3) at least two feedback loops are used, one being the large series loop.

DETAILED DESCRIPTION OF THE PREFERRED EMBODIMENTS

Figure 1:
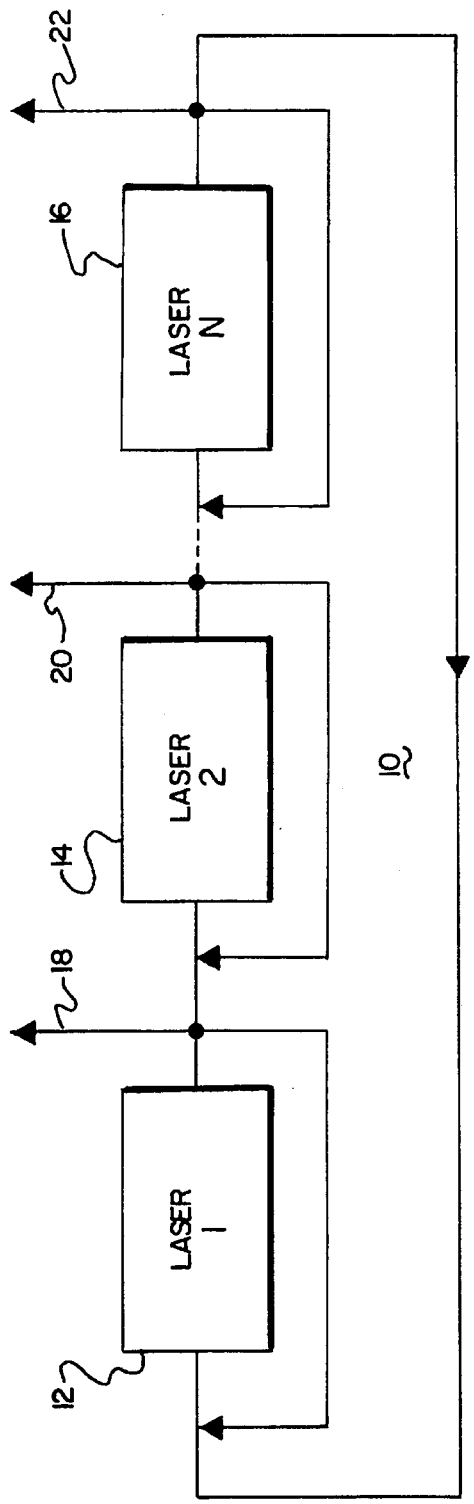
FIG. 1 is a schematic block diagram illustrating an embodiment of the invention.

In the embodiment of FIG. 1, several lasers (1, 2, ... N) are coupled in series to form one large ring laser 10. Each laser module 12, 14, 16 has a portion of its output (18, 20, 22) coupled out to a telescope (the telescopes are not shown) for projection to a target, a portion coupled to the next laser module in the series and a portion fed back to its own input. In the case of the last laser module 16, the feedback output portion is coupled back to the input of the first laser module 12 to complete the ring.

Figure 2:
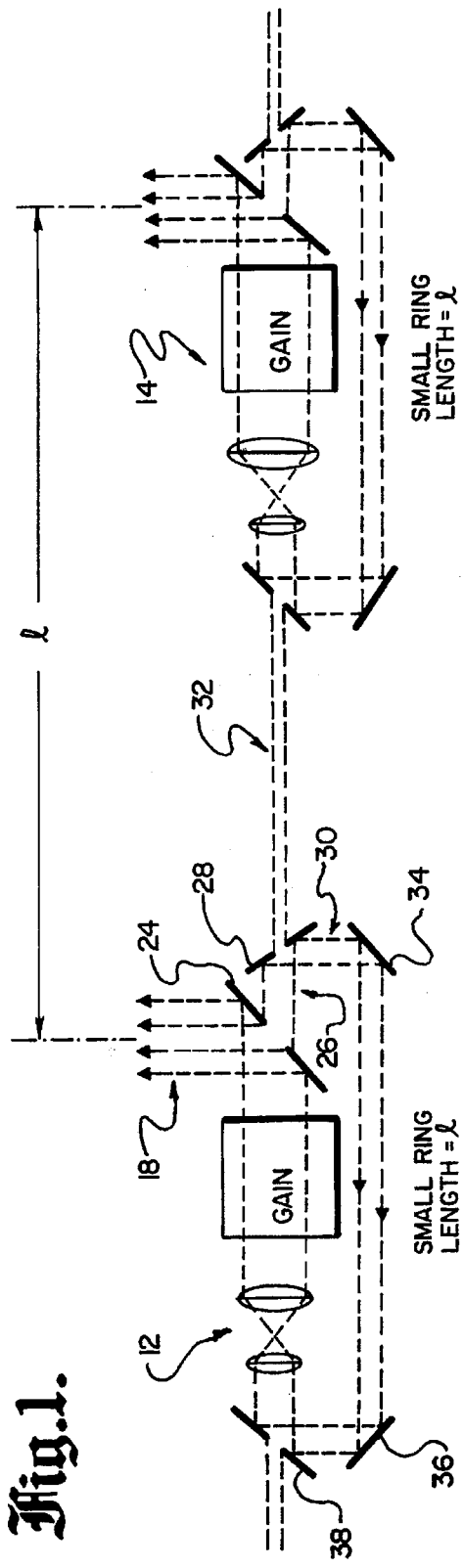
FIG. 2 is a schematic diagram illustrating in greater detail the structure of two of the individual lasers shown in block form in FIG. 1.

FIG. 2 shows some of the details of two of the laser modules (12 and 14) of typical lasers which can be employed in the implementation of the embodiment of the invention shown in FIG. 1. These lasers are well known in the art and thus will not be completely described herein. The output of each laser is coupled to a scraper, e.g., 24, which reflects a portion 18 to a telescope. Another portion 26 of the output is coupled through the hole in the scraper 24 to a second scraper 28 and a portion 30 fed back to the input of the laser via mirrors 34 and 36 and input scraper 38. A third portion 32 of the output of the first laser 12 is fed as input to the next laser module 14 in the series. The distance around the small ring of the laser module 12 is the path length (l). The distance between the output scrapers (or the output beams) of two successive laser modules (e.g., 12 and 14) in the large ring is also (l). The total length of the large ring is (L=Nl) where (N) is the number of laser modules in the large ring laser 10. Actually, the total length of the large ring should be an integral multiple of Nl, but inserting an additional factor will needlessly complicate the equations to be introduced so Nl will be employed hereinafter to indicate an integral multiple of the laser-module path length (l).

The resonance condition for the oscillatory modes of the large ring laser 10 is $$Nl = K\lambda_K \quad (1)$$

where K is an integer such that the light wave travelling around the large ring reproduces itself after each round trip and $\lambda_K$ is the wavelength of the oscillatory mode which results from the particular K value under consideration. Every oscillatory mode in the large ring laser 10 must satisfy the above equation irrespective of what laser spectral line the mode is associated with. Because all the small lasers are coupled in one single large ring, all must oscillate on exactly the same vibrational-rotational (V-J) spectral lines and in exactly the same modes.

It is not enough that the outputs of each laser module have exactly the same spectral lines and modes with exactly the same frequencies. The different modes may have different phases, but each mode which lases must have the same phase at each output scraper in order for path length control (of the output beams to the target) to bring them into phase at the target. The resonance condition for the modes given in equation (1) can be rewritten as follows to provide this condition:

$$\frac{l}{\lambda_\kappa} = \frac{K}{N} = k + \frac{n}{N} \quad (2)$$

where (k) is an integer and (n) is a number that represents a mode, the value of which can be n=0, 1, 2, ... N. The modes of the large ring fall into (N) classes depending on whether (n) is 0, 1, 2, etc. Clearly, the class of modes with n=0 exactly reproduce themselves after traveling a distance (l) through the large ring. A mode of this class (n=0, $$l/\lambda_\kappa = \frac{K}{N} = k)$$

will, therefore, have exactly the same phase at each output scraper at all times. This will be true of every mode of this class no matter what spectral line it is associated with. This is also true if n=N. Furthermore, 1/N of all the longitudinal modes of every V-J spectral line will be of this class, that is, 1/N of all the modes are in phase at each output scraper.

The outputs of the small lasers in FIG. 1 will be phase-locked if the large ring can be restricted to lase only on the desired class of modes. This result is achieved if each small ring laser of FIG. 1 has an equivalent length (l) so as to resonantly (regeneratively) amplify only those modes for which (l/λ) is an integer (for the modes for which n=0 or n=N).

It is interesting to note that if the large ring were constrained to lase only on every $N^{th}$ longitudinal mode, these modes could be brought into almost exact phase lock by a small shift in the location of each scraper even if the modes were of some class other than the class n=0. That is, phase lock could be achieved if all modes were of class n=1, for example, so that $$l/\lambda_\kappa = \frac{K}{N} = k + \frac{1}{N} .$$

However, there is no shift of the scrapers from precisely a separation of (l), because the wavelengths of the different spectral lines (of DF or HF, e.g.) only vary by about ±5%.

Figure 3:
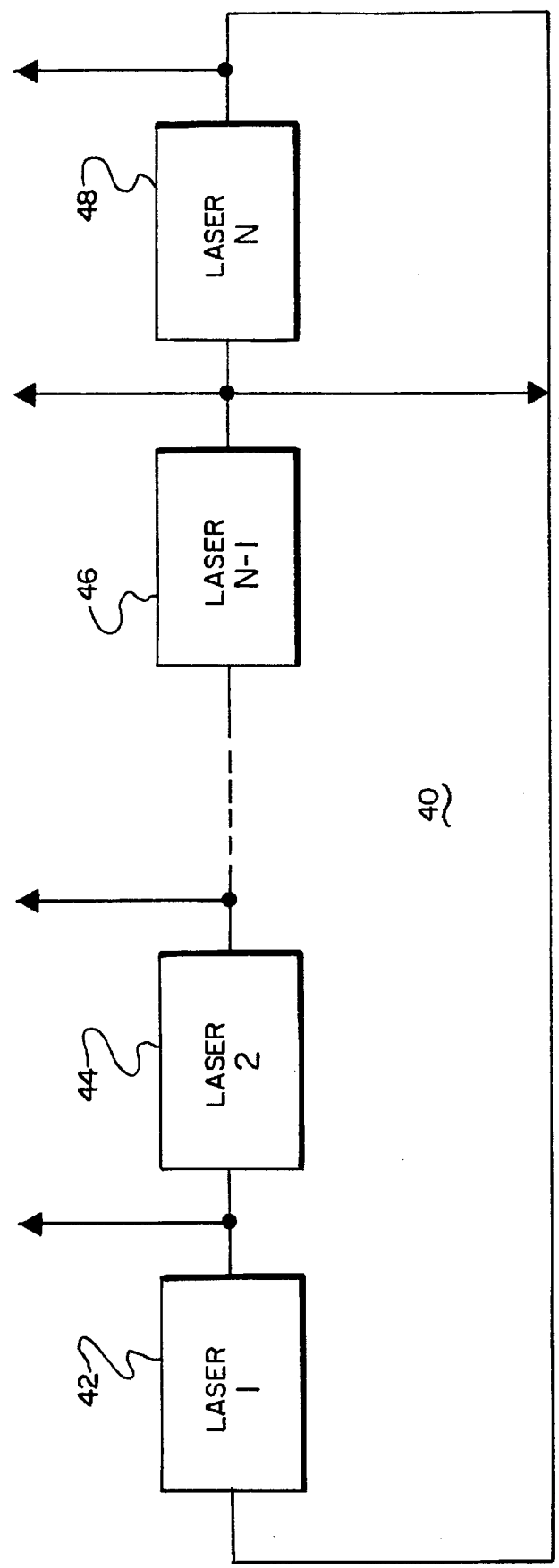
FIG. 3 is a schematic block diagram illustrating another embodiment of the invention.

The method employed herein to set n=0 or n=N so that $$k + \frac{n}{N}$$

does not equal k plus a fraction is to have at least two feedback loops in the device. Thus, in FIG. 1, there is a feedback loop around each laser module and a feedback loop around the large ring fom the output of laser N (16) to the input of laser 1 (12). In FIG. 3, there are two feedback loops, one from the output of laser N (48) to the input of laser 1 (42) and one from the output of laser (N−1) to the input of laser 1 (42). The second feedback loops force the modes generated by the first feedback loop to be only the ones which satisfy the equations $$\frac{l}{\lambda_\kappa} = \frac{K}{N} = k$$

or $$\frac{l}{\lambda_\kappa} = \frac{K}{N} = k + 1$$

Automatic path length control means would comprise means for sensing and controlling the lengths (l) of the small ring lasers to be exactly $$\left(\frac{1}{N}\right)$$

of the length of the large ring. One such means would include (a) a mechanically driven mirror in each small ring, (b) a means for sampling the circulating flux in each small ring (e.g., a small hole in mirror 30 or a small grating in the light path to refract out some light), and (c) a heterodyne detector to detect beat frequencies between the modes of the laser in that sample. When all modes of the large ring lase, heterodyne frequencies will occur at c/Nl, 2c/Nl, 3c/Nl, etc. When only a single class of the desired type lases, the only heterodyne frequencies will occur at c/l, 2c/l, 3c/l, etc. (c is the speed of light). Each mechanically driven mirror should be adjusted to maximize the heterodyne beat amplitude at c/l. In order to generate a servo control signal, each mechanically driven mirror can be dithered with a very small amplitude. Because of the coupling between small rings, the dither frequency for each small ring should be different and the detector for that ring should be tuned to the dither frequency. Even when only modes of the desired class lase, the amplitude of the output and/or circulating flux for each ring will be maximized when the length (l) is resonant with the lasing modes.

Figure 4:
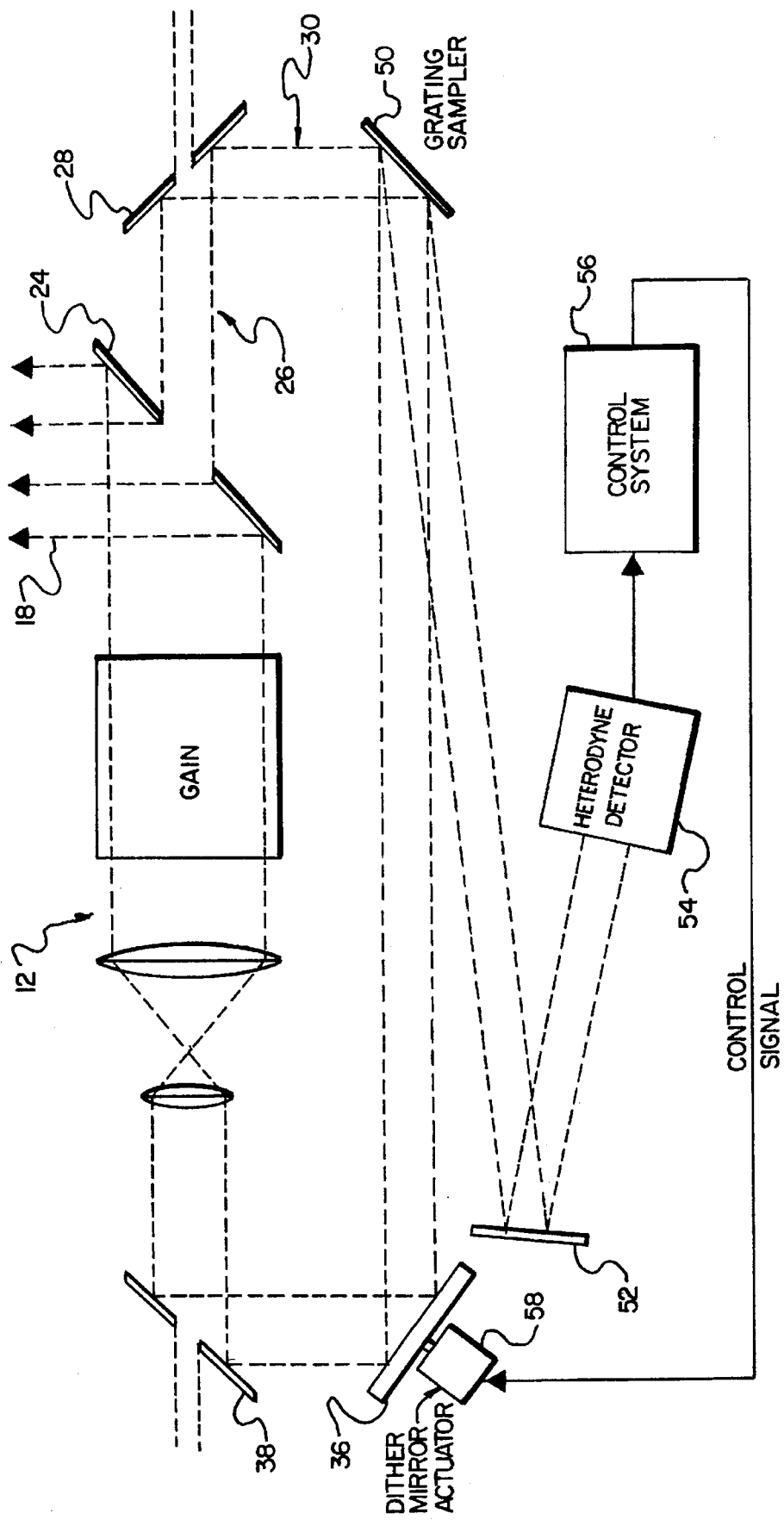
FIG. 4 is a schematic block diagram illustrating a path-length control system for a laser module.

FIG. 4 schematically illustrates an automatic path-length control system. A grating sampler 50 is used here to sample the flux in the feedback loop of a small laser, e.g., 12. The sampled output is reflected by a mirror 52 into a heterodyne detector 54 the output of which is fed to a control system 56. The output of the control system 56 is a control signal which is fed to a mirror actuation device 58, e.g., a piston, which moves to control the position of a dither mirror 36. The position of the dither mirror 36 is altered by the control signal through the piston 58 in such a way as to maximize the c/l signal through the laser 12. Although only one path-length control system is shown, it is to be understood that each small laser will have its own path-length control system.

Figure 5:
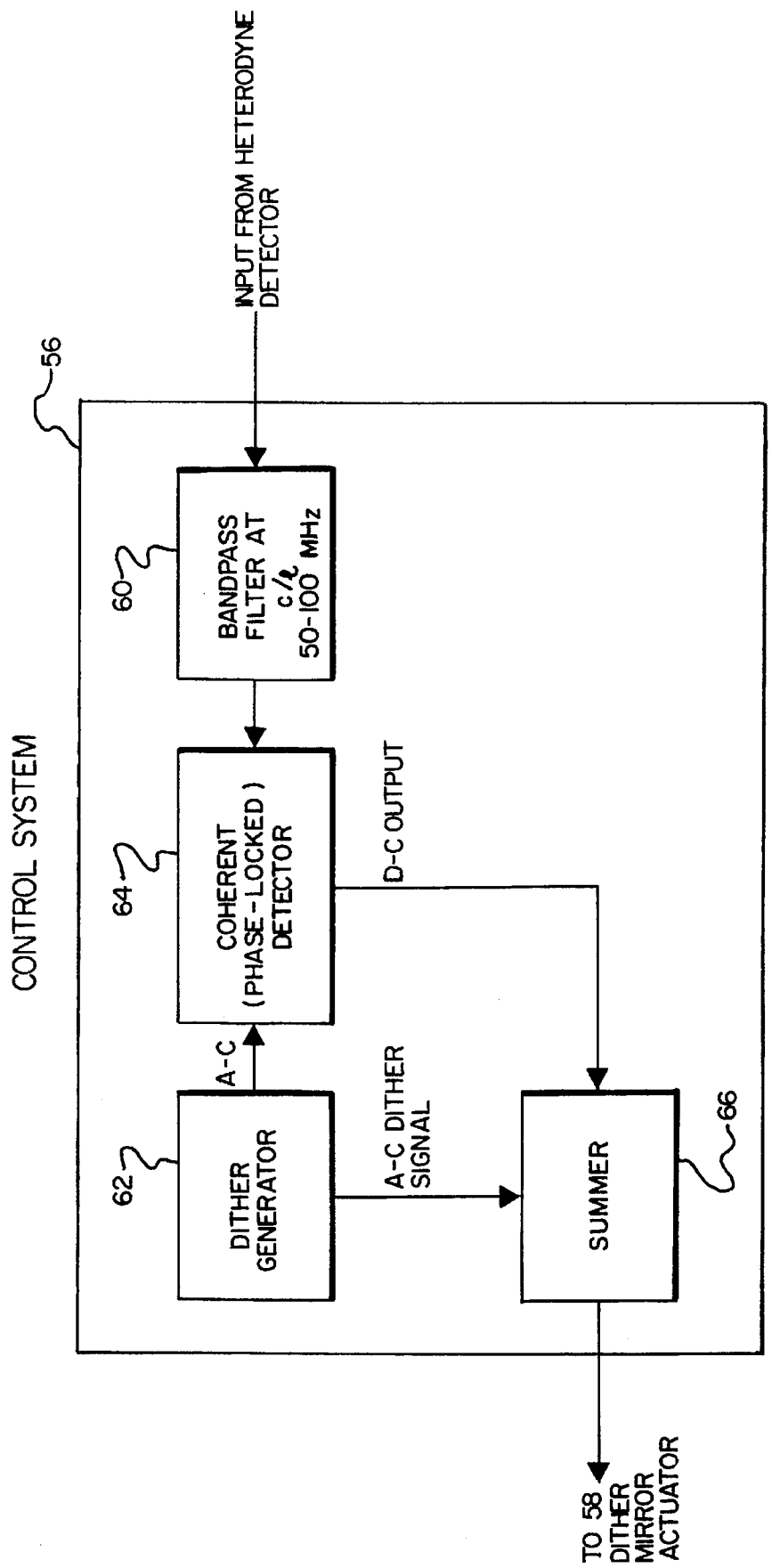
FIG. 5 is a schematic block diagram illustrating the details of the control system block, of FIG. 4.

FIG. 5 shows, in block form, the schematic for an embodiment which may be employed as the control system unit 56. The output from the heterodyne detector 54 is passed through a bandpass filter 60 tuned to pass only the c/l frequency. If l is 5 meters, c/l may be about 60 MHz and the filter passband may, for example, range between 50 and 100 MHz, or 25 and 75 MHz. The output of the filter 60 is fed to a coherent phase-locked detector 64, which may, for example, be a Foster-Seeley detector with an appropriate filter. An AC signal is also fed to the coherent detector 64 from a dither generator 62. The dither frequency may, for example, be 2–20 KHz. The output of the detector 64 is a DC signal which comprises either the sum or difference of its inputs, according to the passband of its filter. The DC output of the coherent detector 64 and the AC dither signal are fed to a summer circuit 66 which feeds the sum of the two signals to the dither mirror actuator 58. The dither mirror 36 is then positioned in accordance with the DC level of the signal and dithered in accordance with the frequency of the AC dither signal.

Several other tuned resonant circuits may be used to restrict laser action in the large ring to a single desired classes of modes. One of these resonant circuits is the embodiment 40 shown in FIG. 3. The large ring has a feedback loop of length (Nl). If a secondary feedback loop is introduced bypassing one of the small laser modules, e.g., 48, it will have a feedback loop length (N−1)l. It is known that this enhances every $N^{th}$ mode relative to the other modes. With this single feedback bypass, the feedback loops of the small ring lasers of FIG. 1 can be eliminated. If more precision is required, one or more other bypass loops may be employed. FIG. 3 shows the two feedback loops previously described. Different feedback loops could be used; for example, the second loop could extend from the output of laser 2 (44) to the input of laser 1 (42). Also, more than two feedback loops could be used.

Another way of defining the conditions under which the desired type of lasing occurs is to say that:

(a) the difference between any two feedback lengths must be equal to l (e.g., the series loop has a length Nl and a second feedback path is formed from the output of the $(N-1)^{th}$ laser module to the input of the series loop); or (b) a single feedback path length must be equal to l (e.g., in FIG. 1, only laser 1 has a feedback path).

In both cases, of course, the length of a path of the series loop must still be Nl.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A laser with multiple phased outputs comprising:

a plurality of laser modules of number (N) arranged serially to form a large ring, the output of the last laser module in the series being fed back as the input to the first module, the laser modules all having substantially identical beam path length (l) and the beam path length of the large ring being substantially equal to an integral multiple of the module beam path length, said large ring having at least one other feedback path than that extending from the output of the last module in the series to the input of the first module in the series.

2. A laser as in claim 1, wherein:

each laser module comprises a feedback ring laser.

3. A laser as in claim 1, wherein:

a portion of the output of the (N−1) laser module is also fed back to the input of the first module.

4. A laser as in claim 1, wherein:

a portion of the output of each of several modules is fed back to the input of the first module.

5. A laser as in claim 1, wherein:

said other feedback path extends from the output of the (N−1) $^{th}$ laser module to the input of the first laser module in the series.

6. A laser with multiple phased outputs comprising:

a plurality of laser modules of number (N) arranged serially to form a large ring, the output of the last laser module in the series being fed back as input to the first module, the beam path length (l) of all laser modules being equal, a portion of the output of each module being removed from the series loop, the laser loop conforming to the equation $$\frac{l}{\lambda_\kappa} = \frac{K}{N} = K + \frac{n}{N}$$

where l is the laser path length of laser module, $\lambda_k$ is the wavelength of the oscillatory mode which results from the particular value of K under consideration, k is an integer, n is a number representing a mode of oscillation and can be equal to 0 or N, N is the number of laser modules in the large ring, and K is an integer such that a light wave travelling around the large ring reproduces itself after each round trip; and means for forcing the value of n to be either 0 or N.

7. A laser as in claim 6, wherein:

said forcing means comprises a second feedback path within said large ring.

8. A laser with multiple phased outputs comprising:

a plurality of laser modules of number (N) arranged to form a large ring, the output of the last laser module in the series being fed back as the input to the first module, the laser modules all having substantially the same beam path lengths (l) and the beam path length of the large ring being substantially equal to an integral multiple of the module beam path length, said large ring of laser modules having at least one other feedback path than that extending from the output of the last module in the series to the input of the first module in the series, the difference between any two feedback path lengths being equal to the beam path length (l) of an individual laser module.

9. A laser with multiple phased outputs comprising:

a plurality of laser modules of number (N) arranged to form a large ring, the output of the last laser module in the series being fed back as the input to the first module, the laser modules all having substantially the same beam path lengths (l) and the beam path length of the large ring being substantially equal to an integral multiple of the module beam path length, said large ring of laser modules having at least one other feedback path than that extending from the output of the last module in the series to the input of the first module in the series, the length of any single feedback path except that from the output to the input of the large ring being equal to the beam path length (l) of an individual laser module.

* * * * *